Apr. 24, 1923.

W. C. STEVENS

CLUTCH

Filed Sept. 27, 1920

1,453,202

Inventor
William C. Stevens.
By
Attorney

Patented Apr. 24, 1923.

1,453,202

UNITED STATES PATENT OFFICE.

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

CLUTCH.

Application filed September 27, 1920. Serial No. 413,057.

*To all whom it may concern:*

Be it known that I, WILLIAM C. STEVENS, a citizen of the United States, residing at Milwaukee, in the county of Milwaukee and State of Wisconsin, have invented new and useful Improvements in Clutches, of which the following is a full, clear, concise, and exact description, reference being had to the accompanying drawing, forming a part of this specification.

This invention relates to clutches.

One object of the invention is to provide a clutch wherein the engaged parts are subjected to a gripping action which increases with the power transmitted through such members and wherein the efficiency of power transmission is rendered independent of normal wear of the engaging parts.

Another object is to provide a clutch wherein a maximum gripping action of the engaging members is obtained with a minimum relative angular movement of said members.

Another object is to provide a clutch wherein a maximum gripping action of the engaging members is produced by slight angular movement of one in either direction with respect to the other whereby backlash between said members is minimized.

Another object is to provide a clutch of the aforesaid character having extensive gripping surfaces.

Various other objects and advantages will hereinafter appear.

The accompanying drawing illustrates certain embodiments of the invention which will now be described, it being understood that the embodiments illustrated are susceptible of various modifications without departing from the scope of the appended claims.

Figure 1:
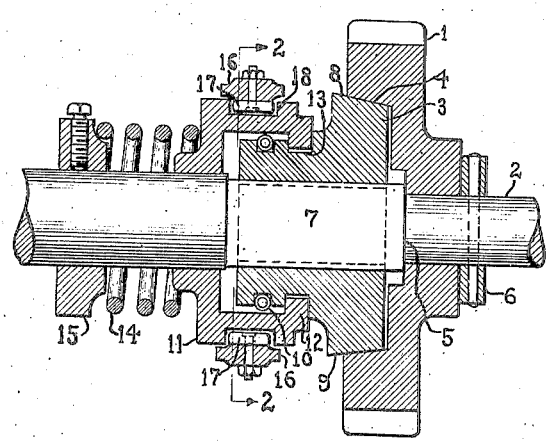
Fig. 1 is a longitudinal sectional view of a clutch embodying the invention.

Referring to Fig. 1 the clutch shown therein includes members 1 and 2 either of which may be the driven member and the other the driving member and an element 3 therebetween for connecting the same.

Figure 2:
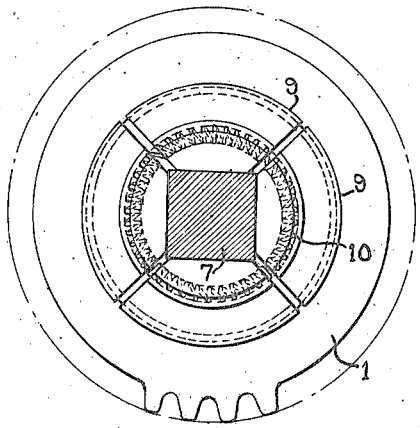
Fig. 2 is a sectional view on line 2—2 of Fig. 1.

The member 1 as shown comprises a gear wheel rotatably mounted on members 2 and having an internal cone friction face 4. The member 2 comprises a shaft provided with a shoulder 5 and a collar 6 arranged on opposite sides of member 1 to prevent axial movement thereof and a square cam portion 7 for supporting element 3. Element 3 is provided with an external cone face 8 for engaging the internal cone face 4 and as shown in Fig. 2, the same is split radially to provide a plurality of similar segments 9. Segments 9 are grooved to receive a garter spring 10 for holding the same in engagement with cam portion 7 and each is provided with a flat inner face for engaging one of the faces of said cam portion.

The segments 9 are movable axially on cam portion 7 into and out of engagement with the internal cone face 4 by a ring member 11 slidably mounted on member 2 and having an inwardly extending annular flange 12 fitting within a groove 13 in said segments. The flange 12 is proportioned to prevent segments 9, when moved axially to release the same from member 1, from moving outwardly under the action of centrifugal force and remaining in engagement with surface 4. Ring member 11 is biased towards the right by a spring 14 located between the same and a collar 15 fixed to member 2 and is movable against the action of said spring by a clutch fork 16. The prongs of fork 16 are shown in section in Fig. 1 and are provided with rollers 17 for engaging the sides of a channel 18 in ring member 11.

From the foregoing it is apparent that spring 15 forces element 3 into engagement with the friction surface 4 and under the action of said spring, segments 9 are subjected to a wedging action between surface 4 and cam portion 7. Under no-load conditions the segments 9 assume positions concentric with respect to the axis of friction surface 4 but when either of the members 1 and 2 is driven and a load is applied to the other, a slight relative rotation of said members will cause the segments 9 to tip slightly on their respective cam faces to positions eccentric with respect to the axis of the internal cone friction surface 4. This tipping movement of the segments 9 subjects the same to an augmented wedging action between surface 4 and cam portion 7 and it is apparent that such wedging action serves to securely lock the members 1 and 2 against further relative rotation.

In the clutch shown in Fig. 1 the angle of inclination of the cone surfaces is made relatively small to prevent segments 9 from moving axially against the action of spring 15 when the same are subjected to the augmented wedging action. This arrangement is desirable in certain installations where it is not necessary to release the clutch under load conditions, and where it is necessary to release the clutch under load conditions the angle of inclination of the cone surface 4 can be increased and means can be provided for positively locking the cone element against axial movement such means being illustrated in Fig. 3.

Figure 3:
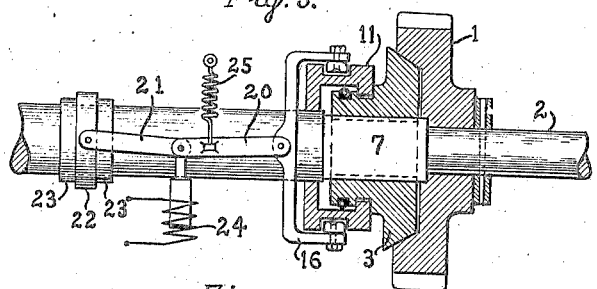
Figs. 3 and 4 are longitudinal sectional views of different forms of electromagnetic clutches embodying the invention.

Referring to Fig. 3, the clutch illustrated therein is provided with a toggle for moving element 3 into and out of engagement with member 1. The toggle includes pivotally connected links 20 and 21, the former being pivoted to clutch fork 16 and the latter to a collar 22 rotatably mounted on member 2 between fixed collars 23. The links are arranged whereby the same can be moved upwardly into substantial alignment to move element 3 into engagement with member 1 and downwardly to effect disengagement of said parts. It is apparent that a relatively small force serves to actuate said links and that when the same are in substantial alignment segments 9 are securely locked against movement out of engagement with member 2. If desired, an operating solenoid 24 can be connected to links 20 and 21 to move the same downwardly to effect release of the clutch and a spring 25 can be provided for moving the same upwardly to effect re-engagement of the clutch upon de-energization of said solenoid or vice versa.

Figure 4:
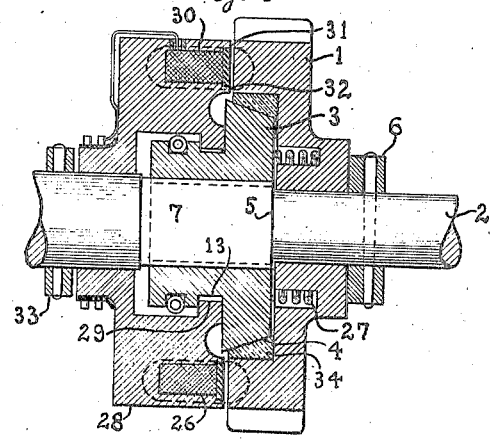

Fig. 4 illustrates another embodiment of the invention wherein the clutch is provided with an annular magnet winding 26 for effecting engagement thereof and a spring 27 for effecting disengagement thereof. The winding 26 is carried by a field member 28 which is rotatably mounted on member 2 and is also slidable axially thereon. Field member 28 is provided with an inwardly extending flange 29 for engaging the sides of recess 13 in segments 9, and is also provided with an annular recess 30 for receiving the winding 26. The recess 30 forms inner and outer annular poles 31 and 32, and upon energization of winding 26 said poles attract the field member 28 towards the face of member 1 to move segments 9 into engagement with surface 4. Upon de-energization of winding 26 the spring 27 moves segments 9 and field member 28 to the left for release of the clutch, such movement being limited by a fixed collar 33 on member 2. To prevent sticking of the clutch upon de-energization of winding 26, the friction surface 4 is formed within an annular non-magnetic member 34 in member 1. The member 34 provides a path of high reluctance between segments 9 and member 1 and tends to limit the flux of winding 26 to the path illustrated by dotted lines.

What I claim as new and desire to secure by Letters Patent is:

1. In a clutch, in combination, relatively rotatable members, one having an internal cone friction surface and the other being arranged concentric to said surface, a cone element mounted on said latter member and engageable with and disengageable from said friction surface by relative axial movement between the same and certain of said members, said element being divided radially to form a plurality of segments and said latter member being formed to provide a plurality of cam surfaces one for engaging each of said segments and means for normally holding said segments in a given relation with respect to said cam surfaces and for permitting movement of the same on said surfaces in a plane at right angles to the axis of said members to augment the pressure of said segments on said friction surface when either of said members tends to drive the other.

2. In a clutch, in combination, relatively rotatable members, one having an internal cone friction surface, and the other being arranged concentric to said surface and a cone friction element mounted on said latter member and slidable thereon into and out of engagement with said friction surface, said element being divided radially to form a plurality of segments and said latter member being formed to provide a plurality of cam surfaces one for engaging each of said segments and spring means for normally holding said segments in a given relation with respect to said cam surfaces and permitting movement of the same on said surfaces in a plane at right angles to the axis of said members to augment the pressure of said segments on said surface when either of said members tends to drive the other.

3. In a clutch, in combination, relatively rotatable members, one having an internal cone friction surface, and the other being arranged concentric to said surface, and a cone friction element mounted on said latter member and slidable thereon into and out of engagement with said friction surface, said element being divided radially to form a plurality of segments and said latter member being formed to provide a plurality of cam surfaces one for engaging each of said segments and a garter spring surrounding said segments for normally holding the same in a given relation with respect to said cam surfaces and permitting movement thereof with respect to said surfaces in a plane at right angles to the axis of said members to augment the pressure of said segments on said friction surface when either of said members tends to drive the other.

In witness whereof, I have hereunto subscribed my name.

WILLIAM C. STEVENS.